Oct. 26, 1965 W. L. WILSON 3,214,284
PRODUCTION OF PIGMENTARY TITANIUM OXIDE
Filed April 25, 1962
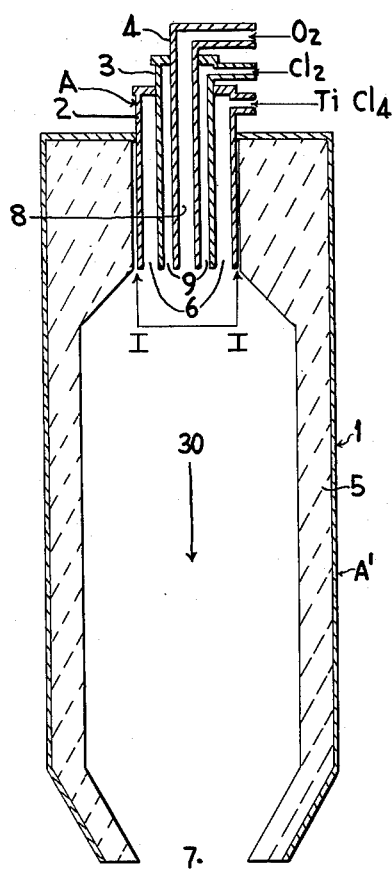
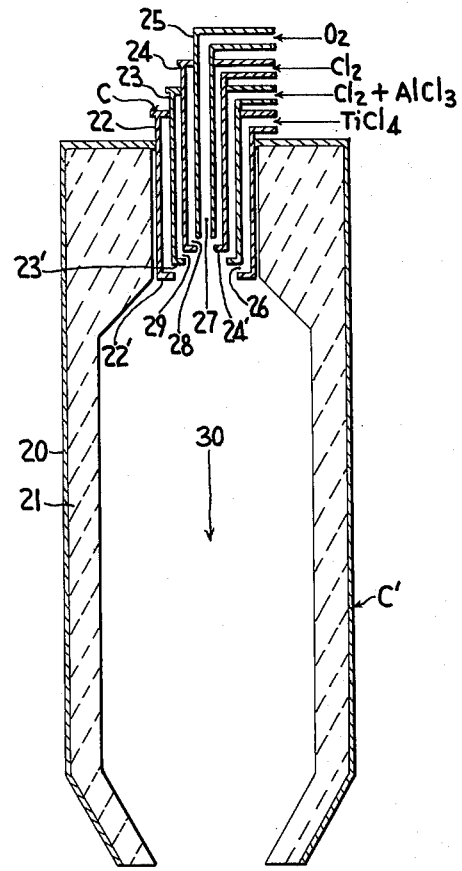
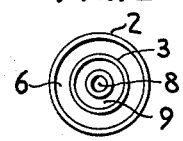
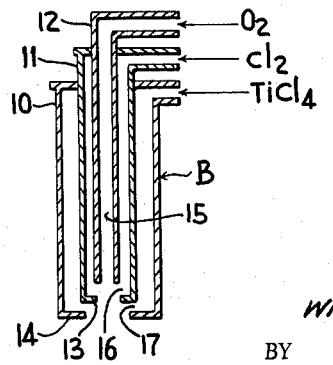
INVENTOR.
WILLIAM L. WILSON
BY
Oscar L. Spencer
ATTORNEY 3,214,284
PRODUCTION OF PIGMENTARY TITANIUM OXIDE
William L. Wilson, Barberton, Ohio, assignor to Pittsburgh Plate Glass Company, Pittsburgh, Pa., a corporation of Pennsylvania
Filed Apr. 25, 1962, Ser. No. 190,140
21 Claims. (Cl. 106—300)

This application is a continuation-in-part of my copending application Serial No. 848,750, filed October 26, 1959, now U.S. Letters Patent 3,069,281.

This invention relates to the production of titanium oxide pigment by vapor phase oxidation of titanium tetrahalide, such as titanium tetrachloride, titanium tetrabromide and titanium tetraiodide.

Until recent years, substantially all pigmentary titanium oxide pigment has been produced by the well-known sulfate process. Considerable interest in recent years has been shown in another method for producing pigmentary titanium oxide. This process involves oxidizing a titanium tetra halide vapor, particularly titanium tetrachloride vapor. This is typically accomplished by reacting titanium tetrachloride vapor and oxygen under controlled conditions at temperatures at which this reaction is relatively rapid.

It is herein described such a process for producing pigmentary titanium oxide of high quality which does not require costly apparatus and rigid operating conditions. A significant feature of this invention is that a reactor burner capable of producing small amounts of quality pigmentary titanium oxide, notably the dioxide, under the terms of this invention may also be employed without change in dimensions and while still operating under this invention, to produce the same quality pigment in much larger quantities. These and other advantages will become apparent from the following description.

This process involves projecting an oxygen containing stream and a separate stream containing titanium tetrahalide vapor to a reaction zone wherein the linear velocity of the oxygen-containing stream is greater than the linear velocity of the stream containing titanium tetrahalide vapor. This process is further characterized in that the effluent from the reaction zone, which is a suspension of pigmentary titanium oxide in reaction product gases, notably halogen from decomposition of titanium tetrahalide, has a linear direction substantially that of the oxygen-containing stream on projection to the reaction zone.

The linear velocity of the oxygen-containing stream relative to that of the stream containing titanium tetrahalide vapor should be great enough to give a positive numerical value in excess of 50, preferably greater than 300, as determined from the formula $$\frac{V_O - V_T}{d_O}$$

where $V_O$ is the linear velocity of the oxygen-containing stream, $V_T$ is the linear velocity of the titanium tetrahalide stream and $d_O$ is the diameter of the oxygen-containing stream on projection to the reaction zone and immediately prior to contact with the titanium tetrahalide-containing stream.

Preferably, the oxygen-containing stream is rectilinearly projected from an inlet opening to the reaction zone. The stream containing titanium tetrahalide, preferably titanium tetrachloride, is desirably fed so as to effect interfacial contact with the oxygen-containing stream for a short period of time prior to complete intermixture of the two streams within the reaction zone.

In the typical operation of the process of this invention, the oxygen-containing stream, projected to the reaction zone in the linear direction that the effluent from the reaction zone is withdrawn therefrom, contacts the separate stream or body of titanium tetrahalide prior to the reaction zone. Due to the higher velocity of the oxygen stream on projection from its inlet relative to the velocity of the titanium tetrahalide stream, preferably titanium tetrachloride, it is theorized that the required amount of tetrahalide necessary for the production of the pigmentary titanium oxide is carried by the oxygen stream into the reaction zone. The high velocity oxygen stream serves to suck and merge the lower velocity titanium tetrahalide stream into it, thereby achieving instantaneous and intimate mixture of the two streams as the streams contact the zone of reaction. Room temperature simulated runs, such as those described below, support the above conclusions. They show that the stream containing titanium tetrachloride merges into the oxygen stream and that complete mixing is achieved in a confined zone along the path of the oxygen stream.

To utilize the high velocity oxygen stream for controlling the direction of titanium tetrachloride and other gases to the reaction zone, it is desirable that the oxygen-containing stream be rectilinearly projected from its opening to the reaction zone. It is therefore desirable to have the oxygen opening face the reaction zone.

Rectilinearly projected or rectilinearly projecting, as herein employed, means that the stream is aimed in a straight-line direction from its inlet opening to the reaction zone. It is not intended to represent that all of the oxygen containing stream is transmitted from the inlet to the reaction zone in a straight-line path. It is apparent that the substanial portion of the stream will travel a straight path, particularly when the stream is projected in a downwardly vertical direction—a preferred mode of operation. However, horizontal projection will cause a slight deviation from straight path flow but the overall flow of the oxygen stream, for all practical purposes, can be assumed to be on a straight line. This does not mean that the oxygen stream cannot be in a turbulent state. For example, the rectilinearly projected stream can have a spin, i.e., can be a spinning stream while the overall flow of the stream is in a single straight-line direction. In any event, the overall flow of the oxygen-containing stream to the reaction zone will be in the same direction as the overall flow of pigmentary product and product gas from the reaction zone.

In a further embodiment of this invention, the stream containing oxygen is rectilinearly projected to a reaction zone, while a separate stream containing titanium tetrahalide is fed thereto. Between these separate streams and prior to contact or intermixture thereof is independently fed a stream comprising inert gas. The velocities of the stream containing oxygen, the stream containing inert gas and the separate stream containing titanium tetrahalide are sufficient to give a positive numerical value in excess of 50, preferably exceeding 300, as determined by the formula $$\frac{V_O + V_I - V_T}{d_O}$$

where $V_O$, $V_T$ and $d_O$ are defined above and $V_I$ is equal to the velocity of the stream containing inert gas.

It is preferred that the oxygen-containing stream is rectilinearly projected to the reaction zone so that the pigmentary titanium oxide and product gases formed in the reaction zone are withdrawn therefrom in substantially the linear direction of the stream containing oxygen.

In determining the aforementioned positive numerical value and any corresponding value hereinafter described, the velocity and diameter measurements are computed in common units. Thus, if velocities are computed in feet per second, then $d_O$ should be computed in feet.

$d_O$, as herein defined, is equal to the diameter of the oxygen-containing gas stream immediately prior to contact with titanium tetrahalide, e.g., within 0.5 second of contact of the separate streams. Preferably, separate inlet openings are employed for feeding the oxygen and titanium tetrahalide vapor to the reaction zone. These inlets are typically adjacent to one another or are separated by the inlet opening from which the inert gas is introduced. In this type of inlet arrangement, $d_O$ is the diameter of the oxygen inlet opening since the diameter of the oxygen-containing stream will not be substantially different immediately prior to contact with the titanium tetrahalide stream. Thus, $d_O$ may be, in this embodiment, the diameter of the stream containing oxygen in projection from its inlet opening.

"Diameter," as herein employed, is the measured diameter of a circular stream or inlet opening or the calculated equivalent diameter thereto when the stream is projected from an inlet opening that has a square, rectangular, elliptical, triangular, or any other kind of shape. The "equivalent diameter" of a shape other than a circle is determined to be equal to the diameter of a circle having the same area as the shape in question. For example, if the oxygen inlet opening is square, $d_O$ is the diameter of a circle having an area equal to the area of the square.

The velocities referred to herein for all streams fed to the reaction zone are linear velocities in a unit of length per second and is computed by dividing the volume of gas (for example, in cubic centimeters per second) on passage through the inlet opening by the area of the inlet opening. Thus velocities, as herein employed, are not to be confused with velocities which characterize a turbulent phase of a gas stream, e.g., the rotational velocity of a spinning gas stream. It is assumed, for the purposes of this invention, that the gases fed to the reaction behave as ideal gases since any deviation therefrom could only result in an insignificant difference in actual volume. Therefore, the effect of temperature of the gas on the volume of the gas is computed to be proportional to the absolute temperature. Temperature may be determined by a variety of methods, for example, optical pyrometric examination and/or a thermocouple fitted at the inlet opening.

When the oxygen-containing stream is fed from a small pipe into a larger pipe and from the larger pipe is projected into contact with the titanium tetrachloride containing stream almost immediately after projection, the determination of the stream's velocity may be based on either the smaller or larger pipe depending on the flow of the stream. If the stream on projection from the larger pipe is in contact with the wall or walls of this pipe, then its area is employed in computing the stream's velocity. Otherwise, the area of the small pipe is employed. Whether the stream contacts the wall of the larger pipe is determinable by operating a room temperature (e.g., 25° C.) simulated run in the same pipe arrangement employing a gas having substantially the density and velocity of the oxygen-containing stream at the temperature employed in the reaction. Such a simulated stream can be smoked in the conventional manner whereby wall contact is visually determinable.

When the inlet openings for the reactants are removed from each other so that there is an appreciable pressure drop of the oxygen-containing stream prior to contacting the titanium tetrachloride vapor, the velocity of the oxygen-containing stream on projection from its inlet opening must be great enough to compensate for the pressure drop and provide the velocity relationship between the reactant streams as described above.

The reaction zone is maintained at a temperature at which the titanium tetrahalide reacts with oxygen. As a rule, the temperature of the reaction zone is from about 750° C. to 1600° C. or higher, preferably from 950° C. to about 1500° C.

The reaction zone temperature is typically achieved by preheating the reactants prior to their introduction to the reaction zone. Thus, the oxygen-containing stream and the titanium tetrahalide-containing stream may be heated to temperatures which on mixing of the streams in the reaction zone, reaction temperatures are achieved. Advantageously, the temperature of the oxygen-containing stream may be greater than that of the titanium tetrahalide-containing stream. For example, the oxygen-containing stream can range from 1100° C. up to 2000° C., while the temperature of the titanium tetrahalide-containing stream ranges from 140° C. up to, for example, 1000° C. On the other hand, both streams may be introduced while at the same temperature.

The amount of titanium tetrahalide and oxygen separately introduced to the reaction zone should be in stoichiometric proportions according to the reaction:

$$TiCl_4 + O_2 \rightarrow TiO_2 + 2Cl_2$$

though greater or slightly lesser quantities of oxygen may be employed. Thus, amounts of oxygen from 0.9 to twice that of stoichiemetric quantities are employable, though it is desirable that the amount of oxygen used is not greater than 10 percent above that of stoichiometry. Usually, the amount of oxygen introduced to the reaction zone ranges from 1.01 to 1.5 moles of $O_2$ for each mole of titanium tetrahalide fed to the reaction zone. If the separate oxygen stream contains less than the stoichiometric amount of elemental oxygen, the remainder may be supplied with the stream containing titanium tetrachloride if the latter stream has a temperature below 600° C. on passage through its inlet opening.

The oxygen-containing stream can be solely composed of oxygen gas or may be a diluted stream containing elemental oxygen. Such a diluted stream includes air or elemental oxygen mixed with the products of combustion of a combustible gas such as carbon monoxide. The latter mixture may be formed by igniting a mixture of elemental oxygen and carbon monoxide gas in a combustion zone removed from the reaction zone. Typically, the amount of oxygen mixed with the CO is in excess of the stoichiometry of the combustion reaction, which excess is typically sufficient to meet the stoichiometry of the reaction: $TiCl_4 + O_2 \rightarrow TiO_2 + 2Cl_2$. For example, CO gas can be mixed with elemental oxygen on the basis of 5 to 40 mole percent, preferably from 10 to 35 mole percent, basis moles of elemental oxygen, and ignited in the combustion chamber to provide a hot mixture having a temperature in excess of 1300° C. which when fed to the reaction zone allows use of a stream containing titanium tetrachloride having a temperature below 600° C., preferably below 500° C. Such a process is described in Example IV below. The amount of elemental oxygen fed to the vapor phase oxidation reaction exclusive of the combustion products is described in the preceding paragraph.

The titanium tetrahalide stream can be fed to the interior of the reaction chamber in which the reaction zone is located from any point thereof, but preferably it is fed either in a linear direction parallel to the oxygen-containing stream on projection of the latter stream from its inlet or is fed from an inlet or inlets in a direction angular to the inlet or inlets through which the oxygen-containing gas is projected. By angular, it is meant that if a theoretical straight line is projected from the titanium tetrachloride inlet in a direction to which it faces, it would intersect a line similarly projected from the oxygen inlet.

When the flow of the titanium tetrahalide stream on emission from its inlet is in a direction parallel to the flow of the oxygen-containing stream on projection from its inlet, both streams may be emitted from their respective inlets in the same or in an opposite linear direction. When the streams are countercurrently emitted, it is preferred that the titanium tetrahalide inlet avoids the path of the inlet through which the stream containing oxygen is projected. In this embodiment, the oxygen stream is able to jet by the inlet through which the titanium tetrahalide-containing stream is emitted, thereby drawing titanium tetrahalide to it and carrying the tetrahalide to the reaction zone. As a result, it is possible for the oxygen-containing stream to contact the titanium tetrachloride prior to complete admixture of the two within a reaction zone.

In a further preferred embodiment of this invention, an inert gas stream (i.e., inert to the reactants under conditions of reaction) is fed from an inlet so as to intervene the oxygen-containing stream and the TiCl$_4$-containing stream as both of these streams issue from their respective inlets. In this embodiment, the inert gas stream is preferably fed from an inlet or inlets so as to surround the oxygen stream as it is projected from its inlet. Both the oxygen-containing stream and the TiCl$_4$-containing stream may be surrounded by the inert gas stream on entry to the interior of the reaction chamber.

If the oxygen is introduced through a plurality of inlets and the TiCl$_4$ is likewise fed to the reaction zone through a plurality of inlets, then each of said streams may be surrounded by an inert gas stream or if these inlets are bundled together, the bundle may be surrounded by a single or plurality of inert gas streams.

The inert gas stream, particularly chlorine gas, has a surprising effect in producing desirable titanium dioxide pigment. It is found that when such an inert gas is employed during the oxidation of titanium tetrahalide, particularly TiCl$_4$, the average particle size of the pigment so produced in accordance with the process above described is considerably smaller than when the inert gas is not employed. When the amount of inert gas employed during the operation is increased, the average particle size of the pigment is progressively reduced. In addition, the inert gas improves the particle size distribution of the pigment produced by the aforementioned process. Moreover, the inert gas, when introduced as described above, prevents encrustation of titanium dioxide on the reactant inlets.

In regard to this last feature, the inert gas shields the oxygen stream from the TiCl$_4$-containing stream so that the two streams do not significantly mix at a point close to the inlets. As a result, premature reaction close to the surface of the inlets is prevented thereby materially minimizing, typically eliminating, hard encrustation of undesirable product at the inlet.

Encrustation as described above is exceedingly undesirable since an excessive amount thereof plugs the flow of the reactants to the reaction zone or tends to shift the flow pattern of the reactants to the reaction zone during an extended run. Such a shift reduces effective contact between the reactants, thereby preventing proper mixing necessary for producing high quality pigmentary product.

The preferred inert gas, as mentioned above, is chlorine, but other gases may also be employed, but these usually do not assert the same effect on pigment particle size as does chlorine. Other inert gases include nitrogen, carbon dioxide, recycle tail gases from the aforementioned reaction, and argon. Typically, the amount of inert gas fed to the reactor interior is on the order of from 0.01 to 200 mole percent, basis moles of titanium tetrahalide introduced to the reaction zone. Preferably, inert gas is employed in amounts from 5 to 100 mole percent.

The inert gas stream should not have a velocity exceeding the oxygen-containing stream. The velocity of the inert gas stream may be equivalent to that of the oxygen-containing stream, but better results are obtainable when its velocity is less than 50 percent of the velocity of the oxygen stream. Significant results have been obtained when the velocity of the inert gas stream ranges from 5 to 40 percent of the velocity of the oxygen-containing stream.

In a preferred embodiment of the aforementioned process, the titanium tetrahalide stream is introduced from an inlet or inlets which circumscribe an inlet or inlets through which is projected the oxygen-containing stream and is substantialy adjacent thereto. In this embodiment, the separate stream containing titanium tetrahalide is fed from its inlet or inlets, with respect to the direction of the oxygen stream, in a direction which is either essentially parallel or laterally directed towards the oxygen-containing stream. Optionally, an intervening inert gas stream may be similarly introduced. The products in the reaction zone are withdrawn therefrom in a linear direction substantially the same as the linear direction of the oxygen-containing stream to the reaction zone.

In this embodiment, it is preferred that the velocity of the stream containing oxygen and the velocity of the stream containing titanium tetrachloride give a positive numerical value above 50 up to 25,000, preferably from 300 to 20,000, as determined by the formula $$\frac{V_O - V_T}{d_O}$$

where $V_O$, $V_T$ and $d_O$ are defined above.

When the inert gas is injected to the reaction as described above, the velocity of the oxygen-containing stream, the inert gas-containing stream and the stream containing titanium tetrahalide should give a positive numerical value in excess of 50 up to 25,000, preferably from 300 to 20,000, as determined by the formula $$\frac{V_O + V_I - V_T}{d_O}$$

where $V_O$, $V_T$, $V_I$ and $d_O$ are defined above.

The significance of the process of this invention lies in its capability of producing high-quality pigmentary titanium dioxide in a relatively simple and reproducible manner. This apparently arises from the fact that the difference in velocity of the oxygen stream and the titanium tetrachloride stream creates controlled flow patterns for intermixing the two reactants. This appears to be supported by the fact that the velocity of the oxygen stream primarily determines the rate of mixing and the diameter of the oxygen stream determines the thoroughness of mixing at the indicated rate. As the velocity rate difference between the two streams is increased, the separate streams are more quickly mixed, whereas when the difference in velocity is reduced, the separate streams are slower to mix.

Thus, when the velocity difference gives a positive numerical value as derived from the formulae $$\frac{V_O - V_T}{d_O}$$

and $$\frac{V_O + V_I - V_T}{d_O}$$

defined above, of at least 300 up to 20,000, most favorable pigmentary titanium dioxide is obtained. In most operations, a positive numerical value above 500 will be found most convenient and effective. When the velocity difference is within this range, the rate of mixing of the separate streams of reactants is highly efficient to produce an optimum pigmentary product having a high tinting strength.

In the above formula, when oxygen, titanium halide and/or inert gas are introduced from a plurality of inlets, then $V_O$, $V_T$ and $V_I$ are equal to the sum of the velocities of the respective gas introduced from these inlets and $d_O$ is equal to the sum of the diameters of the oxygen inlet openings.

To more specifically describe the process of this invention, reference is made to FIGURES 1 through 4, inclusive, which depict apparatus in which the aforementioned process may be effected.

FIGURE 1 describes a diagrammatic cross-section view of a concentric orifice-annulus burner fitted in a furnace.

FIGURE 2 further illustrates the construction of the burner of FIGURE 1.

FIGURE 3 illustrates a diagrammatic cross-section view of a burner which may be fitted in the furnace of FIGURE 1 to produce pigmentary titanium dioxide according to the process of this invention.

FIGURE 4 is a diagrammatic cross-section view of a furnace and a burner similar to that of FIGURE 3 fitted with an additional inlet for introduction of potential nucleating ingredients to the reaction.

Referring to FIGURES 1 and 2, furnace A' which is a concentric steel shell 1, internally lined with firebrick 5 (or other heat resistant insulation), has fitted in its upper part, burner A. At the lower part of furnace A' is a conical bottom terminating at outlet 7.

Burner A is composed of three concentric tubes, 2, 3 and 4. Tube 3 is arranged so as to circumscribe tube 4 and tube 2 is arranged so as to circumscribe tubes 3 and 4. Each of tubes 2 and 3 are evenly spaced from the wall of the tube it circumscribes. This is more clearly shown in FIGURE 2, which shows the tube arrangement taken along line I—I of FIGURE 1.

In the operation of the reactor of FIGURES 1 and 2, oxygen is fed to the upper opening in tube 4, typically preheated to a temperature in excess of 900° C. up to about 1750° C., while inert gas, notably chlorine, is fed to the opening at the top of tube 3 at room temperature up to the temperature of the oxygen stream. Concurrently therewith, TiCl$_4$ is fed to the opening at the upper part of tube 2. The TiCl$_4$ may have a temperature from 140° C. to about 1200° C., preferably from about 250° C. to about 700° C.

The size of the three tubes, 2, 3 and 4, and the feed rates of the reactants and inert gas are provided so as to give a positive number, preferably above 300 to 20,000, as determined by the formula $$\frac{V_O + V_I - V_T}{d_O}$$

defined above.

Product titanium dioxide pigment and chlorine are formed in reaction zone 30 and withdrawn therefrom in the same linear direction as the oxygen stream is projected from opening 8, as depicted by the arrow.

Referring to FIGURE 3, burner B, which may be fitted in furnace A' of FIGURE 1 in replacement of burner A, is composed of three concentric tubes annularly arranged. Central oxygen tube 12 is circumscribed by tube 11, which in turn is circumscribed by tube 10. Tube 11 is provided with an annular lip 13 at its lower end so as to establish, in conjunction with the bottom of tube 12, annular slot 16 which circumscribes the area below tube 12. Tube 10 is provided with annular lip 14 so as to establish annular slot 17 which also circumscribes the area below tube 12. The diameter of slot 16 is typically greater than the diameter of tube 12 whereas the diameter of slot 17 is typically equivalent or greater than the diameter of slot 16.

In operation, burner B is fed in the same manner as burner A of FIGURE 1. The oxygen is jetted past slots 16 and 17 in a straight line to the reaction zone. The inert gas issuing from annular slot 16 circumscribes the high velocity oxygen stream. Vaporous TiCl$_4$ is fed from slot 17 as an enveloping stream circumscribing the oxygen and inert gas streams. The TiCl$_4$ stream retains its identity as the separate streams clear burner B.

As a rule, complete intermixing of the streams does not take place until the streams are 6 inches or more below the bottom of burner B. The point of complete intermixture of the separate streams can be determined by effecting a room temperature simulated run in a model reactor or in the same reactor. For example, air can be projected at the required velocity through tubes 12 and 11 while ammonium acetate smoke at the required velocity is simultaneously fed to tube 10. The point of appreciable intermixing is determined by the lack of identity of each of the streams so that only the ammonium acetate smoke is visible.

Referring to FIGURE 4, furnace C' is a concentric steel shell 20 thermally insulated with, e.g., firebrick 21 and has a conical bottom terminating at an opening. Fitted in the top of furnace C' is burner C, which is composed of four concentric tubes (22, 23, 24 and 25) annularly arranged.

Central tube 25 is circumscribed by tube 24 which in turn is circumscribed by tube 23. Tube 23 is circumscribed by tube 22. Each of tubes 24, 23 and 22 is evenly spaced from the wall of the tube it circumscribes. Each of tubes 22, 23 and 24 is fitted with annular lip 22', 23' and 24', respectively. Annular lip 24', in conjunction with the bottom of tube 25, forms annular slot opening 28 which circumscribes the area below opening 27. Annular lip 23', in conjunction with the bottom of lip 24', forms annular slot opening 29, which opening may have a larger or equivalent diameter to that of opening 28. Annular lip 22', in conjunction with the bottom of lip 23', forms annular slot opening 26, which opening may have a larger or equivalent diameter to that of opening 29.

In operation of burner C, preheated oxygen gas is fed to tube 25, through space 27 and thereby rectilinearly projected to reaction zone 30 in the central interior of furnace C'. Simultaneously therewith chlorine gas is fed to tube 24 while a mixture of chlorine gas and aluminum chloride, in amounts hereinafter prescribed, is fed to tube 23 and vaporous titanium tetrachloride is fed to tube 22.

As the oxygen gas is emitted from opening 27 it is first circumscribed by an enveloping stream of chlorine gas fed from slot 28 and then by an enveloping stream of chlorine and aluminum chloride educted from slot opening 29. Due in part to the small quantity of aluminum chloride relative to the amount of oxygen, the aluminum chloride is almost immediately oxidized to form aluminum oxide particles, the predominant amount of which is of a particle size less than 0.15 micron, preferably less than 0.10 micron. This aluminum oxide, chlorine and oxygen mixture is then surrounded by an enveloping stream of titanium tetrachloride vapor emitted from slot opening 26. The total velocity of the various streams is such as to give a positive numerical value preferably exceeding 300 up to 20,000 as determined from the formula $$\frac{V_O + V_I - V_T}{d_O}$$

where $V_I$ is the sum of the velocities of the streams fed from slots 28 and 29 and $V_O$, $V_T$ and $d_O$ are described above.

Due to this velocity difference, the various merged streams are guided by the oxygen stream to the reaction zone located along its path. The various streams become completely mixed at a point 30 spaced from the bottom of burner C within the interior of furnace C'. Complete mixing of these streams, so that none retain their individual identity, usually takes place at a point located at least 6 inches, generally greater than 12 inches, below the bottom of burner C. The point of complete mixing of these streams is determinable by operating a simulated room temperature run with air and ammonium acetate smoke as described above. The pigment product is withdrawn from zone 30 in substantially the same linear direction as the oxygen stream fed to zone 30.

The inlet openings through which the titanium tetrachloride vapor is fed may be a plurality of pipes rather than an annular slot as described in FIGURES 1 through 4 and the oxygen inlet may have, e.g., a square opening rather than the circular opening depicted above in FIGURES 1 through 4.

The instant discovery will best be understood by reference to the following examples, which although detailed, are not intended to limit the scope of the invention in any way.

*Example I*

In a reactor having a structure similar to that described in FIGURE 1, titanium dioxide of high tinting strength, a blue undertone, a good particle size distribution and an excellent average particle size was produced. Fitted within the top portion of the interior of a furnace having a structure similar to that of A' of FIGURE 1 and an inside diameter of 100 millimeters and an internal length of 400 millimeters long, was a burner having the tube arrangement of burner A. Tube 4, made of quartz, had a 4.4 millimeter inside diameter and a 6.6 millimeter outside diameter. Tube 3, also made of quartz, had a 8.4 millimeter inside diameter and a 10.4 millimeter outside diameter. Tube 2 had a 16.9 millimeter inside diameter, a 19.9 millimeter outside diameter, and also was made of quartz. The tubes were arranged so that their bottom edges facing the interior of the reactor were flush with respect to each other.

Oxygen gas having a temperature of 1000° C. was introduced at a rate of 96 millimoles per minute through tube 4, while 80 millimoles per minute of titanium tetrachloride containing 2.4 millimoles of aluminum chloride and 0.1 millimole of silicon tetrachloride, also preheated to 1000° C., was introduced through tube 2. Concurrent with the introduction of both reactants, 32 millimoles per minute of chlorine gas at 1000° C. was introduced through tube 3. The oxygen stream was jetted to the interior of the furnace through the opening 8 at a velocity of $10^4$ millimeters per second while chlorine gas was simultaneously fed to the interior of the furnace through annular slot 9 at a velocity of 2600 millimeters per second. Concurrent with the introduction of both of these gases to the interior of the furnace, vaporous TiCl$_4$ containing the aforementioned quantities of aluminum chloride and silicon tetrachloride was fed to the interior of the furnace through slot 6 at a velocity of $10^3$ millimeters per second. The raw pigment obtained from the reactor, after separation by filtration from the product gases obtained from the oxidation reaction, had an extremely high rutile content, a high tinting strength and a blue undertone. The velocities of the various gaseous streams fed to the reaction from their respective inlets gave a positive numerical value of 2640 as determined by the formula $$\frac{V_O + V_I - V_T}{d_O}$$

where $V_O$, $V_I$ and $V_T$ are defined above and $d_O$ is 4.4 millimeters.

*Example II*

In a reactor substantially the same as that of Example I, differing only in the size of the burner tubes, there was produced pigmentary titanium dioxide of exceedingly good quality. Tube 4 had a 6 millimeter inside diameter and an 8 millimeter outside diameter; tube 3 had a 10 millimeter inside diameter and a 12 millimeter outside diameter; and tube 2 had a 14.7 millimeter inside diameter and a 17 millimeter outside diameter.

Eighty-eight millimoles per minute of preheated oxygen at 1000° C. was introduced into tube 4, while 20 millimoles per minute of chlorine gas at 1000° C. was introduced into tube 3 and concurrent therewith, vaporous TiCl$_4$ at a temperature of 1000° C. was introduced to tube 2 at a rate of 80 millimoles per minute. The titanium tetrachloride stream also contained 2.4 millimoles of aluminum chloride and 0.1 millimoles of silicon tetrachloride. The raw titanium dioxide pigment removed from the reaction zone had a high rutile content and a high tinting strength. The particle size and particle size distribution of the pigment was very good. The velocity of the oxygen stream at 5400 millimeters per second; the chlorine stream at 1200 millimeters per second; and the titanium tetrachloride stream at 2460 millimeters per second gave a positive numerical value of 690 as determined by the formula $$\frac{V_O + V_I - V_T}{d_O}$$

where $d_O$ is 6 millimeters.

*Example III*

In a furnace similar to that described in FIGURE 1, there is employed a burner having a design similar to that described in FIGURE 3, except that tube 11 does not have annular lip 13 and the bottom edge of tube 12 is flush with the bottom of tube 11. Tube 12 has a 7.4 millimeter inside diameter and a 10.4 millimeter outside diameter. Tube 11 has a 24.3 millimeter inside diameter and a 26.8 millimeter outside diameter. Tube 10 has a 32.5 millimeter inside diameter and a 35 millimeter outside diameter. All of the tubes are made of quartz and each tube is fitted equidistance from the adjacent and parallelly arranged tube. Tube 10 has annular lip 14 at its lower portion which overlaps to the interior facing of tube 11. The annular lip is 3.0 millimeters below the bottom of tubes 11 and 12 and the diameter across the lip is 24.3 millimeters. Slot 17, formed by the lip in conjunction with the bottom edge of tube 11, has a width of 3.0 millimeters.

Oxygen gas having a temperature of 1000° C. is fed to tube 12 at a rate of 88 millimoles per minute, while chlorine gas at 1000° C. is fed to tube 11 at a rate of 16 millimoles per minute. The chlorine gas contains aluminum chloride so that aluminum chloride is fed to tube 11 simultaneous with the chlorine gas and at a rate of 2.4 millimoles per minute. Concurrent therewith, titanium tetrachloride at 1000° C. is fed to tube 10 at a rate of 80 millimoles per minute. The vaporous TiCl$_4$ contains silicon tetrachloride which is introduced therewith at a rate of 0.1 millimole per minute. The titanium tetrachloride stream fed to tube 10 has a temperature of 1000° C.

The raw pigment from the reaction after being isolated from product gases in which it is suspended has a high rutile content, a high tinting strength and a blue undertone. The particle size distribution and average particle size of the pigment is found to be of good pigmentary quality. The velocity of the oxygen stream is 3555 millimeters per second, the titanium tetrachloride stream is 606 millimeters per second and the chlorine stream is 74 millimeters per second giving a positive numerical value of 408 as determined by the formula $$\frac{V_O + V_I - V_T}{d_O}$$

*Example IV*

In this example, a reactor of the type described in FIGURE 4 was employed. Steel covered, concentric shaft furnace C', having a firebrick insulation, had an internal diameter of 27 inches. Fitted in its upper portion was a burner similar in design to that of C described in FIGURE 4. From the bottom of this burner to the outlet end of the furnace C' was a reaction chamber of 8.35 feet long.

The burner employed in this example had tubes 25, 24, 23 and 22 arranged as described for burner C of FIGURE 4. Tube 25 had an outside diameter of 9.25 inches and an internal diameter of 1½ inches for a length of 7.5 inches from the bottom thereof. Above this 1½ inch diameter 7.5 inch length portion, the interior of tube 25 abruptly expanded to a diameter of 4 inches for a distance of 12.5 inches to form a cylindrical chamber 4 inches in diameter and 12.5 inches in height. The entire interior of tube 25 was lined with firebrick, whereas the exterior was made of nickel internally cooled with air to a temperature of 315° C. A pipe was centrally disposed in the cylindrical chamber terminating 6 inches above the point of abrupt expansion. This pipe was closed at its bottom and was made of lava (an aluminum silicate refractory). One to 4 inches from the bottom of this pipe were a plurality of small holes, each 7/32 of an inch in diameter, provided to allow a gas fed to the interior of the pipe to pass therethrough into the expanded chamber interior of tube 25. This inserted pipe had an outside diameter of 1.25 inches and an inside diameter of 0.75 inch.

Tube 24, also made of internally air-cooled nickel, had an inside diameter of 10 inches and an outside diameter of 11 inches. Annular lip 24' at the lower portion of tube 24 was 1/4 of an inch below the bottom tip of tube 25, therewith forming 1/4 of an inch annular slot 28. The diameter across slot 28 was 2.5 inches. Tube 23, also made of cooled nickel, had an inside diameter of 11.25 inches and an outside diameter of 12.75 inches. Annular lip 23' at the bottom of tube 23, in conjunction with annular lip 24' forms slot 29 having a diameter of 2.75 inches and a 0.25 inch width. Air-cooled nickel tube 22 had an inside diameter of 14 inches and an outside diameter of 15 inches. Annular lip 22' was 3/8 of an inch below the bottom of annular lip 23' and in conjunction therewith formed slot 26 having a width of 3/8 of an inch and a diameter of 3 inches.

Burner C was snugly fitted in the upper portion of furnace C'.

Carbon monoxide gas at a rate of 4.2 gram moles per minute was fed to the pipe located in the expanded chamber of tube 25. Simultaneously therewith, oxygen at a rate of 11.0 gram moles per minute was fed to the interior of the expanded chamber of tube 25 exterior of the pipe through which the carbon monoxide was fed. Both the carbon monoxide and oxygen gas were at ambient temperature. On contact of the two streams, by spraying the carbon monoxide through the holes of the pipe to the oxygen stream, a small flame was inserted in the chamber to ignite the oxygen and carbon monoxide mixture thereby producing a stream of oxygen containing $CO_2$ and having a temperature slightly above 1500° C. (as estimated from the temperature of the firebrick). This hot stream was fed from the chamber to the 1½ inch diameter portion of tube 25 and consequently projected into the interior of furnace C for 8 hours, after which 8.1 gram moles per minute of $TiCl_4$ containing 0.05 gram moles per minute of $SiCl_4$ was simultaneously introduced to tube 22. The $TiCl_4$ containing the silicon tetrachloride, on introduction to tube 22, had a temperature of 427° C. Simultaneous with the introduction of the $TiCl_4$ stream, chlorine gas at 150° C. was introduced at a rate of 3 gram moles per minute to the interior of tube 24 and a mixture of chlorine gas and aluminum chloride having a temperature of 150° C. and containing 1.4 gram moles per minute of chlorine and 0.2 gram moles per minute of aluminum chloride was introduced as a mixture to the interior of pipe 23. After 120 minutes of operation, the reaction zone was found to have a temperature of 1260° C.

The titanium dioxide product educted from the interior of furnace C after separation from product gases in which it was suspended, was found to have a high tinting strength and a blue undertone when employed in white enamels. The particle size distribution and average particle size of the pigment was excellent. The velocities of the various streams issuing from openings 27, 26, 28 and 29 gave a value of 694 as determined from the formula $$\frac{V_O + V_I - V_T}{d_O}$$

where $V_I$ is the sum of the velocities of the chlorine stream and the mixed chlorine-aluminum chloride stream and $V_O$, $V_T$ and $d_O$ are defined above.

In addition, it has also been found that certain additives to the reactant streams, as hereinabove described, give significant and beneficial results as characterized by the properties of the pigmentary titanium dioxide produced. For example, if an aluminum compound, notably an aluminum salt such as $AlCl_3$, is added to the titanium tetrahalide stream or the intervening inert gas stream, the titanium dioxide product so produced is found to have an increased rutile content, typically in excess of 98 percent, in most cases above 99 percent.

The addition of these aluminum compounds to the reaction typically causes no loss in the pigment's other beneficial properties. This same result occurs when zirconium salt, particularly zirconium tetrachloride, is similarly added to the reaction.

The amount of aluminum and zirconium compound added to the reaction may vary within a great range, though it is advisable to employ from about 0.5 to about 10 mole percent, basis moles of titanium tetrahalide reacted. This should give a corresponding molar concentration of aluminum and/or zirconium in the pigment.

A silicon halide, such as silicon tetrachloride, may also be incorporated in the reaction by addition to the titanium tetrahalide stream or the inert gas stream. Silicon halides are found to repress the particle size growth of the pigment produced in the oxidation reaction. Additionally, this additive is found to favor the production of an anatase pigment. But when the silicon additive is conjointly added with the aforementioned aluminum or zirconium additives, the anatase forming character of the silicon additives is repressed, particularly when it is employed in amounts of from 0.001 to 2.7 mole percent, preferably from 0.01 to 2 mole percent, basis moles of titanium tetrahalide introduced to the reaction. Most favorable results are obtained when the amount of silicon additive is in the range of from about 0.2 to 1.2 mole percent, basis moles of titanium tetrahalide added to the reaction. The resulting pigmentary product will contain a silicon content similar to the molar concentration of the silicon halide fed to the reaction. Simultaneous with the addition of the silicon additives, there may also be added the aluminum or zirconium compounds in the amounts indicated for these additives.

There may also be introduced to the reaction alkali metal and/or alkaline earth metal compounds. Potassium compounds are found to give particularly beneficial results with regard to the type of pigment produced. The potassium compound may be in salt or other form. Typical usable salts include potassium chloride, potassium sulfate, potassium nitrate or potassium acetate, or a mixture of these. Other contemplated potassium compounds include organic potassium compounds where the potassium is directly bonded to a carbon atom of an organic radical. Examples of organic compounds are potassium alkyls, such as ethyl potassium and nonyl potassium; aromatic potassium compounds, such as potassium benzene (phenyl potassium), 1,4-di-potassium phenylene, and 1,7-di-potassium anthracene; aralkyl potassium such as benzyl potassium; or alkaryl potassium compounds such as di-potassium durene (1,4-di-potassium-2,3,5,6-tetramethyl benzene) and xylyl potassium. The potassium salts may be added to the oxygen stream prior to its entry to the interior of the reactor or may be separately fed to the reaction zone by the introduction of another stream. Alternatively, the salts may be added to either the inert gas stream of the $TiCl_4$ stream or both. The organic potassium compounds are most conveniently added to the $TiCl_4$ stream when the $TiCl_4$ stream has a temperature below 600° C., preferably below 500° C.

When the potassium compounds are added to the oxygen stream, they may be first suspended in an air stream or an oxygen stream by atomizing the potassium compound into the stream. The potassium compound suspended in the stream will thereby be carried into the reaction zone. This may be most effectively effected when the oxygen stream has a temperature above 500° C.

These potassium compounds are found to act similar to the silicon compounds in that they tend to repress the particle size of the pigmentary titanium oxide produced during reaction. These compounds differ from the silicon compound insofar as they appear not to favor the production of an anatase pigment. Thus, it may be employed alone or in conjunction with the aluminum compounds or may be employed in conjunction with the silicon compounds where the aluminum compound is also concurrently added.

Certain other metals or metal compounds may be beneficially employed in conjunction with the aforementioned potassium compounds or as a substitute for these potassium compounds to effect the same result. Contemplated metals are those listed in Groups I A and B (other than potassium) having an atomic weight below 133 and Groups II A and B having an atomic weight below 138 of the Periodic Chart of the Elements found at pages 58 and 59 of Lange's Handbook of Chemistry, Sixth Edition (1946), published by Handbook Publishers, Inc., Sandusky, Ohio. Of these metals, magnesium, calcium, copper and zinc are preferred. These metals may be employed in the metallic vapor state or as salts, viz., magnesium chloride or phosphate, calcium chloride or acetate, cupric chloride or sulphate, vaporous zinc or zinc oxalate; or they may be bonded directly to carbon of an organic compound.

The above metals (including potassium) may be added to the vapor phase oxidation of $TiCl_4$ in amounts ranging from 0.01 to 10,000 parts by weight of metal ion per million parts by weight of titanium dioxide obtained from the oxidation reaction. Preferably, the amount of metal ion added is less than 1,000 parts by weight per million parts by weight of titanium dioxide. In view of the small amounts needed to benefit the pigment, the amount of metal or metal compound added is typically determined by the amount of the metal found in the pigment so produced.

In copending application Serial No. 37,789, filed June 21, 1960, there is disclosed a method of producing titanium dioxide which involves the significant feature of introducing finely-divided, white, non-discoloring metal oxide into the vapor phase oxidation reaction. The disclosure of this copending application is incorporated herein by reference.

The method of introducing the finely-divided white metal oxide particles as described in said copending application is illustrated in Example IV above, where the oxygen stream first comes into contact with a stream containing a mixture of chlorine and aluminum chloride. This results in effecting a reaction between aluminum chloride and oxygen to produce small particle sized aluminum oxide which on being carried along with the oxygen stream contacts $TiCl_4$ vapor further along the path of the oxygen stream or in the reaction zone.

Preferably, the greatest portion of the finely-divided metal oxide particles, notably aluminum oxide, is of a particle size below 0.15 micron, preferably below 0.10 micron. In the case of Example IV above, the particle size of the aluminum oxide formed by the reaction between aluminum chloride in admixture with chlorine and the oxygen stream is determinable by simply shutting off the introduction of $TiCl_4$ to the reaction. In this fashion, only oxygen is reacted with aluminum chloride, and the resulting aluminum oxide particles may be recovered from the reaction chamber. Collection of the aluminum oxide particles should be effected as high up in the interior of the reaction chamber as possible, preferably within 4 feet from the bottom of the burner. These metal oxides may be added in amounts ranging from 0.1 to 20 mole percent metal oxide, preferably from 0.1 to 10 mole percent metal oxide, basis moles of titanium tetrahalide, preferably titanium tetrachloride, fed to the oxidation reaction.

In a further embodiment of this invention, it is desirable to pass inert gas along the furnace wall during the reaction. Contemplated inert gases include chlorine gas or recycled gases which are obtained from the reaction after pigment removal. The gases typically have a temperature below 1000° C., preferably below 500° C., and generally above 50° C. Preferably, this gas is fed to the interior of the furnace at a point adjacent or below the reaction zone. Introduction of the gas may be effected through a pipe or a plurality of spaced pipes inserted through the wall of the furnace and projected therefrom in a tangential direction along the wall interior and laterally with respect to the direction of the oxygen stream. Typically, there is added 0.01 to 100 pounds of recycled gas for every pound of $TiO_2$ produced.

This gas stream serves to reduce, generally eliminate, hard titanium dioxide particle accretion on the interior wall of the furnace thereby removing the possibility of reactor plugging and keeping down pigment loss through accretion.

Though the above process has been described with regard to specific embodiments, such is not to be considered as limiting the invention except insofar as these embodiments are found in the following claims.

I claim:

1. In the process of producing pigmentary titanium oxide by vapor phase oxidation of titanium tetrahalide, the improvement which comprises projecting a central stream containing oxygen and feeding a separate adjacent stream containing titanium tetrahalide vapor to a reaction zone where the linear velocity of the stream containing oxygen is greater than the linear velocity of the stream containing titanium tetrahalide such that the oxygen stream serves to suck and carry the lower velocity titanium tetrahalide stream into the zone of reaction.

2. In the process of producing pigmentary titanium oxide by vapor phase oxidation of titanium tetrahalide, the improvement which comprises rectilinearly projecting a stream containing oxygen and feeding a separate stream containing titanium tetrahalide vapor to a reaction zone where the linear velocity of the stream containing oxygen is sufficient relative to the linear velocity of the separate stream containing titanium tetrahalide to give a positive numerical value in excess of 50 as determined by the formula $$\frac{V_O - V_T}{d_O}$$

wherein $V_O$ is the linear velocity of the stream containing oxygen in a unit of length per second, $V_T$ is the linear velocity of the stream containing titanium tetrahalide vapor in a unit of length per second, and $d_O$ is the diameter in a unit of length of the stream containing oxygen, $V_O$, $V_T$, and $d_O$ being computed in a common unit of length, and withdrawing product from the reaction zone in substantially the same linear direction as the stream containing oxygen is projected to the reaction zone.

3. In the process of producing pigmentary titanium oxide by reaction of titanium tetrachloride vapor with oxygen in a reaction zone, the improvement which comprises introducing to the reaction zone a rectilinearly projected stream containing oxygen and a separate stream containing titanium tetrachloride vapor, which streams effect contact prior to the reaction zone, the stream containing oxygen having a linear velocity relative to that of the stream containing titanium tetrachloride vapor great enough to give a positive numerical value in excess of 50 as determined by the formula $$\frac{V_O - V_T}{d_O}$$

wherein $V_O$ is the linear velocity of the stream containing oxygen in a unit of length per second, $V_T$ is the linear velocity of the stream containing titanium tetrachloride vapor in a unit of length per second and $d_O$ is the diameter in a unit of length of the stream containing oxygen prior to contact with the stream containing titanium tetrachloride, $V_O$, $V_T$, and $d_O$ being computed in a common unit of length, and withdrawing product from the reaction zone in substantially the same linear direction as the stream containing oxygen is projected to the reaction zone.

4. In the process of producing pigmentary titanium oxide by reaction of titanium tetrahalide vapor and oxygen in a reaction zone, the improvement which comprises introducing, to effect intermixture in the reaction zone, a rectilinearly projected stream containing oxygen and a separate stream containing titanium tetrahalide vapor, feeding between said streams prior to intermixture thereof an inert gas stream, where the linear velocities of the stream containing oxygen, inert gas stream and stream containing titanium tetrahalide are such as to give a positive numerical value in excess of 50 as determined by the formula $$\frac{V_O + V_I - V_T}{d_O}$$

wherein $V_O$ is the linear velocity in a unit of length per second of the stream containing oxygen, $V_I$ is the linear velocity in a unit of length per second of the inert gas stream, $V_T$ is the linear velocity in a unit of length per second of the stream containing titanium tetrahalide and $d_O$ is the diameter in a unit of length of the stream containing oxygen, the unit of length being common for $V_O$, $V_I$, $V_T$, and $d_O$.

5. In a process of producing pigmentary titanium oxide by reaction of oxygen and titanium tetrachloride vapor in a reaction zone, the improvement which comprises rectilinearly projecting a stream containing oxygen to the reaction zone from an opening facing the reaction zone, feeding to the zone a separate stream containing titanium tetrachloride vapor from an opening substantially adjacent the opening from which the stream containing oxygen is projected, the stream containing oxygen having a linear velocity relative to that of the stream containing titanium tetrachloride vapor great enough to give a positive numerical value in excess of 50 as determined from the formula $$\frac{V_O - V_T}{d_O}$$

wherein $V_O$ is the velocity expressed in a unit of length per second of the stream containing oxygen, $V_T$ is the velocity expressed in a unit of length per second of the stream containing titanium tetrachloride vapor and $d_O$ is the diameter expressed in a unit of length of the stream containing oxygen on projection from its opening, $V_O$, $V_T$, and $d_O$ being expressed in a common unit of length, and withdrawing product from the reaction zone in substantially the same linear direction as the stream containing oxygen is projected to the reaction zone.

6. In the process of producing pigmentary titanium oxide by reaction of oxygen and titanium tetrachloride vapor in a reaction zone, the improvement which comprises rectilinearly projecting a stream containing oxygen from an opening facing the reaction zone to the reaction zone, introducing to the zone a separate stream containing titanium tetrachloride vapor from a different opening substantially adjacent the opening from which the stream containing oxygen is projected, feeding simultaneously with the introduction of the stream containing titanium tetrachloride an inert gas stream from an opening intervening the openings for the separate streams containing oxygen and titanium tetrachloride, the stream containing oxygen and the inert gas stream having linear velocities relative to that of the stream containing titanium tetrachloride which are great enough to give a positive numerical value in excess of 50 as determined by the formula $$\frac{V_O + V_I - V_T}{d_O}$$

wherein $V_O$ is the linear velocity computed in a unit of length per second of the stream containing oxygen, $V_I$ is the linear velocity computed in a unit of length per second of the stream containing inert gas, $V_T$ is the linear velocity computed in a unit of length per second of the stream containing titanium tetrachloride vapor and $d_O$ is the diameter computed in a unit of length of the stream containing oxygen on projection from its opening, $V_O$, $V_I$, $V_T$, and $d_O$ being computed in a common unit of length, and withdrawing product from the reaction zone in substantially the same linear direction as the stream containing oxygen is projected to the reaction zone.

7. In the process of producing pigmentary titanium oxide by reaction of oxygen and titanium tetrachloride vapor in a reaction zone, the improvement which comprises rectilinearly projecting to the reaction zone a central stream containing oxygen having suspended therein metal oxide particles the greatest proportion of which are below 0.15 micron, and feeding a separate surrounding lower velocity stream containing titanium tetrachloride to the reaction zone, the linear velocity of said stream containing oxygen being great enough to suck and merge the lower velocity titanium tetrachloride stream into it such that complete and intimate mixing is achieved as the two streams contact the reaction zone.

8. The process of claim 4 wherein the inert gas is chlorine.

9. In the production of pigmentary titanium oxide by vapor phase oxidation of titanium tetrachloride in a zone of reaction, the improvement which comprises rectilinearly projecting a stream containing oxygen from an opening facing the zone of reaction to the zone, simultaneously feeding a separate stream containing titanium tetrachloride to the zone of reaction from sources surrounding the stream containing oxygen, wherein the linear velocity of the stream containing oxygen relative to that of the stream containing titanium tetrachloride is great enough to give a positive numerical value in excess of 300 as determined from the formula $$\frac{V_O - V_T}{d_O}$$

wherein $V_O$ is the linear velocity computed in a unit of length per second of the stream containing oxygen, $V_T$ is the linear velocity computed in a unit of length per second of the stream containing titanium tetrachloride and $D_O$ is the diameter computed in a unit of length of the stream containing oxygen on projection from its opening, $V_O$, $V_T$, and $d_O$ being computed in a common unit of length.

10. In the production of pigmentary titanium oxide by vapor phase oxidation of titanium tetrachloride in a zone of reaction, the improvement which comprises rectilinearly projecting a stream containing oxygen to the zone of reaction from an opening facing the zone, contacting the stream containing oxygen after projection from its opening with a separate stream of inert gas and thereafter contacting the stream containing oxygen and inert gas stream with a separate stream containing titanium tetrachloride vapor, wherein the linear velocities of the stream containing oxygen and the inert gas stream relative to that of the stream containing titanium tetrachloride are great enough to give a positive numerical value in excess of 300 as determined from the formula $$\frac{V_O + V_I - V_T}{d_O}$$

wherein $V_O$ is the linear velocity in a unit of length per second of the stream containing oxygen, $V_I$ is the linear velocity in a unit of length per second of the stream of inert gas, $V_T$ is the velocity of the stream containing titanium tetrachloride and $d_O$ is the diameter in a unit of length of the stream containing oxygen on projection from its opening, $V_O$, $V_I$, $V_T$, and $d_O$ having a common unit of length.

11. The process of claim 10 wherein the linear velocity of the stream of inert gas is not in excess of the linear velocity of the stream containing oxygen.

12. The process of claim 10 wherein the linear velocity of the stream of inert gas is not in excess of 50 percent of the linear velocity of the stream containing oxygen.

13. In the production of pigmentary titanium oxide by vapor phase oxidation of titanium tetrachloride in a reaction zone, the improvement which comprises rectilinearly projecting a stream containing oxygen to the reaction zone from an opening facing the zone, feeding a separate stream containing titanium tetrachloride vapor to the reaction zone from a different opening in the same linear direction as the stream containing oxygen so that both streams are fed to the reaction zone as parallel streams, where the linear velocity of the stream containing oxygen relative to that of the stream containing titanium tetrachloride is great enough to give a positive numerical value in excess of 300 as determined by the formula $$\frac{V_O - V_T}{d_O}$$

wherein $V_O$ is the linear velocity computed in a unit of length per second of the stream containing oxygen, $V_T$ is the linear velocity computed in a unit of length per second of the stream containing titanium tetrachloride and $d_O$ is the diameter computed in a unit of length of the stream containing oxygen on projection from its opening, $V_O$, $V_T$, and $d_O$ being computed in a common unit of length, and withdrawing product from the reaction zone in substantially the linear direction of the stream containing oxygen to the reaction zone.

14. In the production of pigmentary titanium oxide by vapor phase oxidation of titanium tetrachloride in a reaction zone, the improvement which comprises rectilinearly projecting a stream containing oxygen to the reaction zone from an opening facing the reaction zone, feeding a separate stream containing titanium tetrachloride parallel to the stream containing oxygen to the reaction zone, introducing between both streams a separate stream of inert gas which contacts the stream containing oxygen prior to the reaction zone, the linear velocities of the stream containing oxygen and the stream of inert gas relative to that of the stream containing titanium tetrachloride are great enough to give a positive numerical value in excess of 300 as determined by the formula $$\frac{V_O + V_I - V_T}{d_O}$$

wherein $V_O$ is the linear velocity computed in a unit of length per second of the stream containing oxygen, $V_I$ is the linear velocity computed in a unit of length per second of the stream of inert gas, $V_T$ is the linear velocity computed in a unit of length per second of the stream containing titanium tetrachloride and $d_O$ is the diameter computed in a unit of length of the stream containing oxygen on projection from its opening, $V_O$, $V_I$, $V_T$, and $d_O$ being computed in a common unit of length, and withdrawing product from the reaction zone in substantially the linear direction of the stream containing oxygen on projection from its opening.

15. The process of claim 10 wherein the stream of inert gas contains a salt from the group consisting of aluminum chloride and zirconium tetrachloride.

16. In the process of producing pigmentary titanium oxide by vapor phase oxidation of titanium tetrachloride in a reaction zone, the improvement which comprises rectilinearly projecting a stream containing oxygen to the reaction zone from an opening facing the reaction zone, feeding a separate stream containing titanium tetrachloride from an annular slot surrounding the stream containing oxygen on projection from its opening where the linear velocity of the stream containing oxygen relative to that of the stream containing titanium tetrachloride is great enough to give a positive numerical value in excess of 300 as determined by the formula $$\frac{V_O - V_T}{d_O}$$

wherein $V_O$ is the linear velocity computed in a unit of length per second of the stream containing oxygen, $V_T$ is the linear velocity computed in a unit of length per second of the stream containing titanium tetrachloride and $d_O$ is the diameter in a unit of length of the stream containing oxygen on projection from its opening, $V_O$, $V_T$, and $d_O$ being computed in a common unit of length, and withdrawing product from the reaction zone in substantially the direction of the stream containing oxygen on projection from its opening.

17. The process of claim 16 wherein the stream containing titanium tetrachloride is fed from the slot into the stream containing oxygen in a linear direction angular to the linear direction of the stream containing oxygen.

18. In the production of a pigmentary titanium oxide by vapor phase oxidation of titanium tetrachloride, the improvement which comprises feeding a stream containing titanium tetrachloride and simultaneously rectilinearly projecting a separate high velocity stream containing oxygen to a reaction zone, the oxygen stream being at a sufficiently greater linear velocity than that of the titanium tetrachloride stream such to suck and merge the lower velocity titanium tetrachloride stream into it and effect rapid intimate mixture of the two streams as they contact the reaction zone.

19. In the production of pigmentary titanium dioxide by vapor phase oxidation of titanium tetrahalide wherein separate streams of oxygen and titanium tetrahalide are fed and mixed in a reaction zone, the improvement which comprises feeding the oxygen stream as a high velocity stream rectilinearly projected toward the reaction zone, the velocity of the oxygen stream being so much greater than the titanium tetrahalide stream so as to cause the titanium tetrahalide to merge thereinto in a confined zone along the path of the oxygen stream.

20. In a process of producing pigmentary titanium oxide by vapor phase oxidation of titanium tetrachloride, the improvement which comprises rectilinearly projecting an oxygen stream at a temperature of at least 900° C. from an opening facing a reaction zone, feeding titanium tetrachloride toward the reaction zone from another opening such that the titanium tetrachloride stream is substantially concentric to the oxygen stream, the linear velocity of the oxygen stream being so much greater than the titanium tetrachloride stream to provide merging of the titanium tetrachloride stream with the oxygen stream along the flow path of the oxygen toward the reaction zone with intimate mixing of the two streams being effected as the streams contact the reaction zone.

21. In the process for producing pigmentary titanium oxide by the action of oxygen and titanium tetrachloride vapor in a reaction zone, the improvement which comprises rectilinearly projecting a stream containing oxygen at a temperature of 900° C. to 2000° C. toward a zone of reaction at 750° C. to 1600° C. from an opening facing the zone, contacting the oxygen stream after projection from its opening with a separate stream of inert gas, feeding a separate stream containing titanium tetrachloride at a temperature of 140° C. to 1000° C. from a different and separate opening, the oxygen and titanium tetrachloride being fed in approximate stoichiometric proportions for producing titanium oxide, the stream containing oxygen being fed at a linear velocity which is sufficiently greater than the linear velocity of the stream containing titanium tetrachloride such that the higher velocity oxygen stream serves to suck and merge the lower velocity titanium tetrachloride stream into it causing instantaneous and intimate mixing of the two streams as they contact the reaction zone.

References Cited by the Examiner
UNITED STATES PATENTS

| | | | |
|---|---|---|---|
| 2,488,439 | 11/49 | Schaumann | 106—300 |
| 2,937,928 | 5/60 | Hughes et al. | 23—202 |
| 2,980,509 | 4/61 | Frey | 106—300 |

TOBIAS E. LEVOW, *Primary Examiner.*